(No Model.) 2 Sheets—Sheet 1.
C. C. & W. T. WALKER.
APPARATUS FOR THE PURIFICATION OF COAL GAS.
No. 272,804. Patented Feb. 20, 1883.
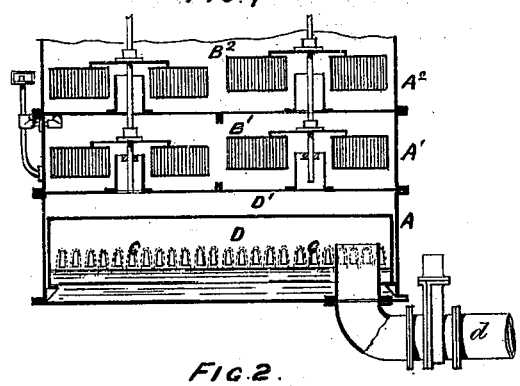
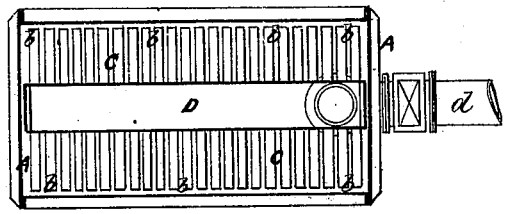
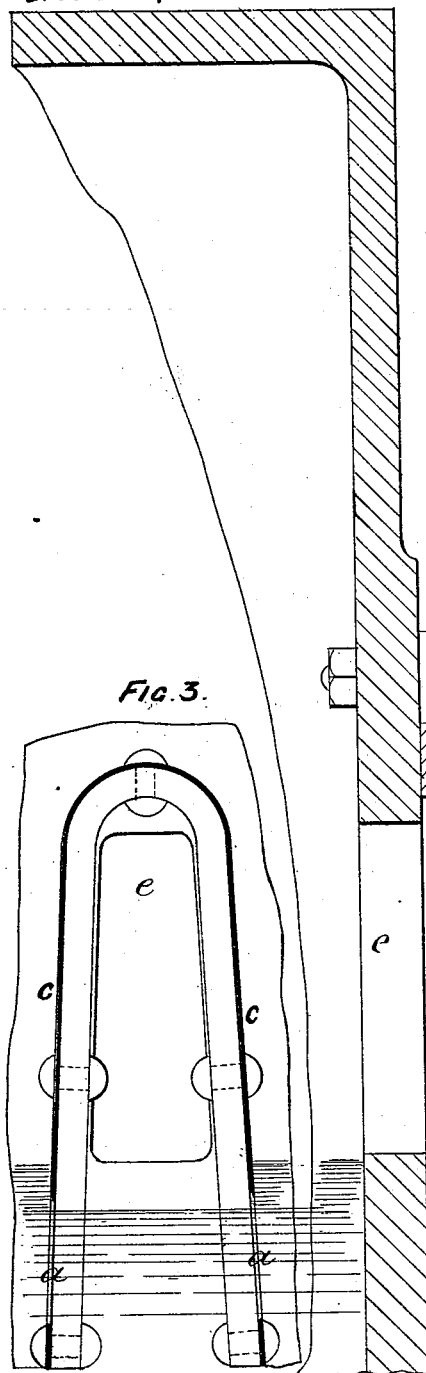
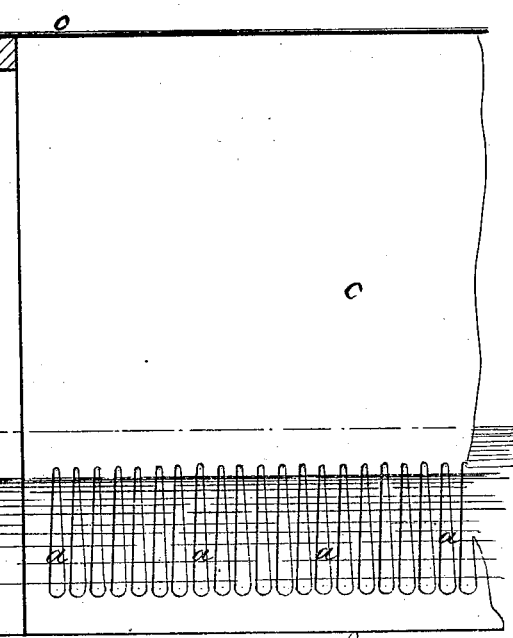
Witnesses
Harry Drury
Harry Smith
Inventors
Charles Clement Walker
and
William Thomas Walker
by their Attorneys
Howson and Sons (No Model.) 2 Sheets—Sheet 2.
C. C. & W. T. WALKER.
APPARATUS FOR THE PURIFICATION OF COAL GAS.
No. 272,804. Patented Feb. 20, 1883.
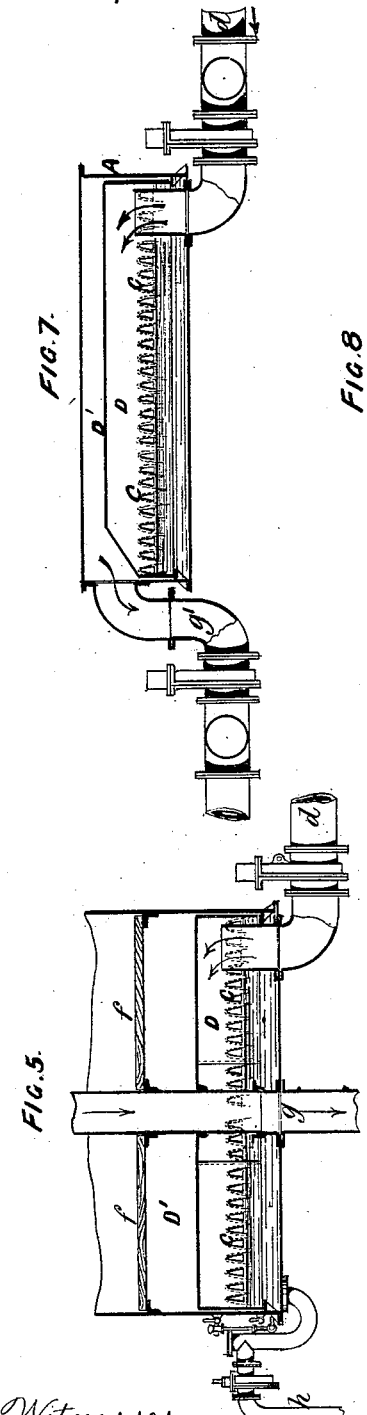
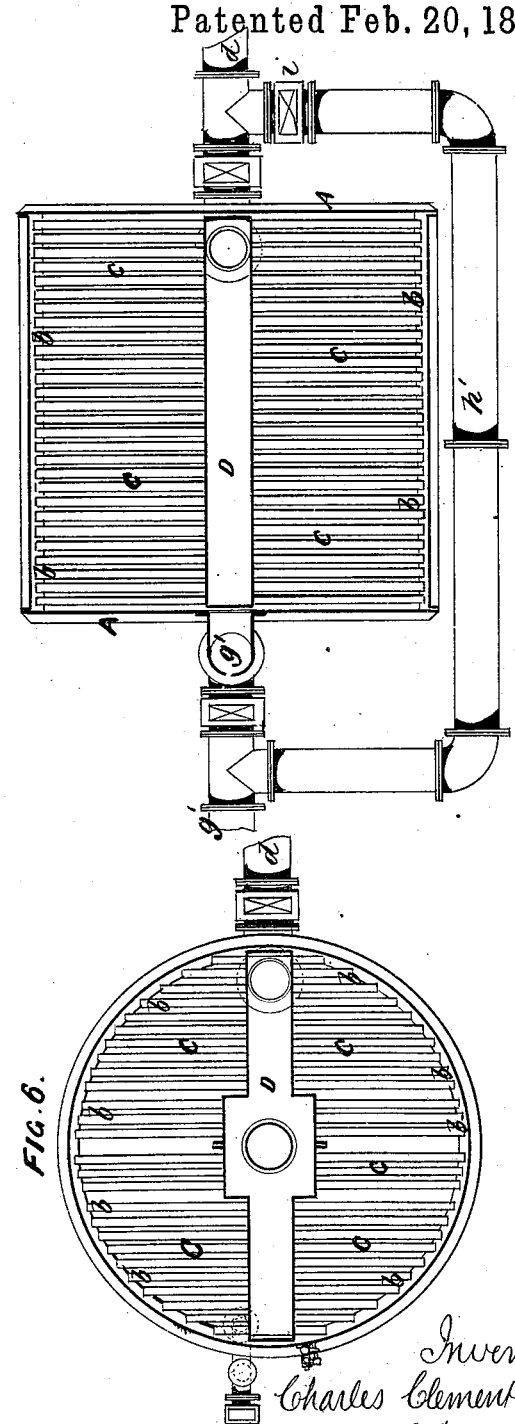

UNITED STATES PATENT OFFICE.

CHARLES C. WALKER, OF LILLESHALL, COUNTY OF SALOP, AND WILLIAM T. WALKER, OF HIGHGATE, COUNTY OF MIDDLESEX, ENGLAND.

APPARATUS FOR THE PURIFICATION OF COAL-GAS.

SPECIFICATION forming part of Letters Patent No. 272,804, dated February 20, 1883.

Application filed October 17, 1881. (No model.) Patented in England August 19, 1881, No. 3,619; in France September 13, 1881, No. 144,826; in Germany September 15, 1881, No. 18,249; in Belgium September 16, 1881, No. 55,749, and in Austria January 5, 1882, No. 32,098.

*To all whom it may concern:*

Be it known that we, CHARLES CLEMENT WALKER and WILLIAM THOMAS WALKER, subjects of the Queen of Great Britain, and residing respectively at Lilleshall, in the county of Salop, and Highgate, in the county of Middlesex, both in the Kingdom of England, have invented certain Improvements in Apparatus for the Purification of Coal-Gas, (for which we have obtained a patent in Great Britain, No. 3,619, dated 19th of August, 1881,) of which the following is a specification.

Our invention has reference to the apparatus described in the specification to former Letters Patent granted to William Mann and William Thomas Walker, dated the 9th of August, 1881, No. 245,527, for improvements in apparatus for the purification of coal-gas. In this apparatus a series of scrubbing devices of bars or rods are used in a series of superposed tanks, which scrubbing devices form elongated passages, through which, after their being wetted, the gas to be purified is caused to pass in order to be acted upon by the fluid used for purification.

Now, our present invention has for its object the maintaining of the elongated passages described open and clean for the free passage of the gas to be purified, and preventing the elongated passages from becoming choked and stopped up by the deposit of heavy viscid tarry and carbonaceous matter, and also preventing the surfaces of the bars or rods from becoming coated and clogged with viscid tarry and carbonaceous matter, by which their purifying action becomes impaired. For this purpose we use a washing apparatus of novel construction, as hereinafter described, placed in the lowermost tank of the machine, and in some cases in the two or more lowermost tanks. This apparatus consists of series of chambers, each formed by bending a thin sheet of wrought-iron or steel into an inverted-trough shape and making a series of slots or perforations in the lower parts of the sides thereof, the extreme or outer end of the trough being closed, while the other end is attached to the side of a chamber in which the gas to be purified is received. The inverted troughs, so constructed, are arranged in any required number at suitable distances apart in the tank, so that their lowermost portion, in which the slots or perforations are formed, shall be immersed in the water, ammoniacal liquor, or other purifying-fluid contained in the said tank. The gas is thus caused to pass into these inverted troughs in both directions and escapes into the upper part of the tank through the slots or perforations of the submerged portions of the troughs, whereby the tarry and carbonaceous matters are completely eliminated before the gas is conducted into the scrubbing devices above. By reason, moreover, of the gas being finely divided by its passage through the strong ammoniacal liquor obtained, it is also to a great extent freed from the carbonic acid originally contained therein. This apparatus may also be applied to other scrubbers—such, for example, as that known as the "Mann & Walker scrubber"— in order to prevent all liability of their becoming choked with tarry and carbonaceous matter and of their purifying-power being thereby impaired, and it may also be applied as a washer separate from the scrubber.

In order that our said invention may be fully understood, we shall now proceed more particularly to describe the same, and for that purpose shall refer to the several figures on the annexed sheet of drawings, the same letters of reference indicating corresponding parts in all the figures.

Figure 1 of the accompanying drawings represents a vertical section of a portion of a scrubbing apparatus constructed according to the said former specification with our invention applied to the lowermost tank of the said apparatus, and Fig. 2 is a horizontal section of the same. Fig. 3 is a vertical section, drawn to a larger scale, of one of the inverted troughs hereinbefore referred to and more fully hereinafter described; and Fig. 4 is a longitudinal section of a portion of the said trough with its connection to the side of the chamber in which the gas is received. Figs. 5 and 6 are respectively a vertical and a horizontal section, illustrating the application of the invention to what is known as the "Mann & Walker scrubber." Figs. 7 and 8 are similar views to Figs. 5 and 6, showing the same apparatus adapted for use as a washer separate from a scrubber.

Referring to Figs. 1, 2, 3, and 4, A, Figs. 1 and 2, is the lowermost tank of the apparatus described in the said former specification, and A', A², Fig. 2, are two of the superposed tanks above containing the scrubbing devices B' B² described in the said former specification. According to our present invention we substitute for the said scrubbing devices in the lowermost tank, A, or in the two or more lowermost tanks, if desired, a washing apparatus of the construction next hereinafter described. The apparatus consists of a series of chambers, C, each formed by bending a thin sheet of wrought-iron or steel into an inverted-trough shape, as shown clearly in Fig. 3, and making a series of slots or perforations, a, by preference tapering, in the lower part of the sides thereof, (see Figs. 3 and 4,) the extreme or outer end, b, Fig. 2, of the trough being closed, while the other end, c, is attached, as shown most clearly in Fig. 4, to the side of a chamber, D, in which the gas to be purified is received. The inverted troughs C, so constructed, are arranged in any required number at suitable distances apart in the tank A, Figs. 1 and 2, so that their lowermost portion, in which the slots or perforations are formed, shall be immersed in the water, ammoniacal liquor, or other purifying-fluid contained in the said tank. The gas admitted by the pipe d into the chamber D is thus caused to pass through apertures e into the inverted troughs C at opposite sides of the chamber D, and escapes from the troughs into the upper part, D', of the tank through the slots or perforations a of the submerged portion of the said troughs in both directions, whereby the tarry and carbonaceous matters are completely eliminated before the gas is conducted into the scrubbing devices B' B² above. By reason, moreover, of the gas being finely divided by its passage through the strong ammoniacal liquor obtained, it is also to a great extent freed from the carbonic acid originally contained therein. This arrangement also possesses the further advantage that the area of free opening of the slots or perforations a is regulated automatically, according to the consumption of the gas itself, since any increase of pressure has the effect of forcing a portion of the liquid out of the overflow-pipe with which the tanks are provided, while as and when the pressure is reduced the normal level of the liquid is restored. By reason, also, of the sides of the perforated surfaces being vertical they are self-cleaning in their action, whereas horizontal surfaces are liable to become coated and clogged with deposit. The advantages which result from making these inverted troughs of sheet metal, having taper perforations which do not extend to the lower edges of the trough, but terminate at some distance above them, instead of making the troughs of cast-iron, with serrations at the bottom edges, are that, first, owing to the slits terminating above the bottom edges of the troughs, the gas is all compelled to pass through the slits, and none passes beneath the bottom edges of the troughs, so that the gas is finely divided; and, second, as the troughs are made of thin sheet metal, (preferably about one-sixteenth of an inch thick,) the slits can be of much less width than is otherwise possible, and the side surface of the slits is so small that it does not retain the tar. In the cast-iron troughs, with notched lower edges, if, on the one hand, the serrations be made narrow they become clogged with the tar, and are very soon rendered useless, and, on the other hand, if they be made of a sufficient width to prevent this they do not divide the gas into streams fine enough to cause the tars to be separated. With our perforated sheet-metal trough the slits do not become clogged, and they divide the gas into fine streams.

Figs. 5 and 6 illustrate the application of the invention to scrubbers of the type known as the "Mann & Walker scrubber." The apparatus is constructed and arranged in a similar manner to the apparatus hereinbefore described with reference to Figs. 1, 2, 3, and 4, being placed at the lower part of the scrubber; but in lieu of the gas passing through the devices formed of rods or bars before referred to, it is conducted from the upper part, D', of the tank A, through the coke or other similar-acting substance situated at f, and finally escapes downward through the central pipe, g. A pipe and cock slide valve, h, are provided for regulating the height of the liquid, and also for drawing off the liquid when required.

Figs. 7 and 8 illustrate the use of our improved apparatus as a washer separate from a scrubber. In this case the gas escapes from the upper part, D', of the tank A by the pipe g', whence it may be conducted into a separate scrubbing apparatus, if desired. In order to by-pass the gas so that it may be conducted away by the pipe g' direct without passing through the liquid, an external pipe, h', is provided leading from the pipe d to the pipe g', the last-mentioned pipe being fitted with a valve, i, so that the gas may be turned in either direction, as desired.

We claim as our invention—

The combination of the washing-tank of a gas-washer, having an inlet and outlet, with a series of inverted troughs of sheet metal, having tapered slits or perforations at some distance from the bottom edges, and adapted to be submerged in the purifying-liquid, all substantially as set forth.

In testimony whereof we have signed our names to this specification in the presence of two subscribing witnesses.

CHARLES CLEMENT WALKER.
WILLIAM THOMAS WALKER.

Witnesses to the signature of Charles Clement Walker:
G. SANDFORD CORSER,
*Shrewsbury, Solicitor and Notary Public.*
EUGÈNE N. DESHAMES,
*7 Marine Terrace, Shrewsbury, Solicitor's Clerk.*

Witnesses to the signature of William Thomas Walker:
ALFRED FEATHERSTONE,
CHARLES T. R. WILKINS,
*Both of 8 Finsbury Circus, London, E. C.*